US009004479B2

(12) United States Patent
Fisher

(10) Patent No.: US 9,004,479 B2
(45) Date of Patent: Apr. 14, 2015

(54) APPARATUS FOR HOLDING A SKI OR SNOWBOARD DURING REPAIR AND MAINTENANCE

(76) Inventor: Aldrich C. Fisher, Bozeman, MT (US)

( * ) Notice: Subject to any disclaimer, the term of this patent is extended or adjusted under 35 U.S.C. 154(b) by 0 days.

(21) Appl. No.: 13/414,916

(22) Filed: Mar. 8, 2012

(65) Prior Publication Data

US 2012/0235341 A1 Sep. 20, 2012

Related U.S. Application Data

(60) Provisional application No. 61/464,848, filed on Mar. 10, 2011.

(51) Int. Cl.
*B23Q 3/00* (2006.01)
*B25B 1/04* (2006.01)
*B25B 11/00* (2006.01)
*A63C 11/00* (2006.01)
*A63C 11/04* (2006.01)
*A63C 11/14* (2006.01)

(52) U.S. Cl.
CPC ................. *B25B 11/00* (2013.01); *A63C 11/04* (2013.01); *A63C 11/14* (2013.01)

(58) Field of Classification Search
USPC ............. 269/296, 43, 71, 88, 97, 37; 280/814
See application file for complete search history.

(56) References Cited

U.S. PATENT DOCUMENTS

| | | | | | |
|---|---|---|---|---|---|
| 3,854,712 | A | * | 12/1974 | McGee | 269/43 |
| 3,963,234 | A | * | 6/1976 | Bejtlich | 269/296 |
| 4,048,700 | A | * | 9/1977 | Browne | 280/814 |
| 4,050,685 | A | * | 9/1977 | Cox | 269/296 |
| 4,078,780 | A | * | 3/1978 | Schwarz | 269/88 |
| 4,081,180 | A | * | 3/1978 | Munn | 269/88 |
| 4,175,736 | A | | 11/1979 | Dietlein | |
| 4,262,890 | A | * | 4/1981 | Sisko et al. | 269/21 |
| 4,669,713 | A | * | 6/1987 | Armantrout et al. | 269/43 |
| 5,150,887 | A | * | 9/1992 | Weissenborn et al. | 269/71 |
| 5,236,183 | A | | 8/1993 | Curtis | |
| 5,848,783 | A | * | 12/1998 | Weissenborn | 269/97 |
| 6,585,248 | B2 | * | 7/2003 | Baud | 269/296 |
| 6,663,094 | B2 | | 12/2003 | Weissenborn | |
| 6,880,817 | B2 | * | 4/2005 | Clarke | 269/50 |
| 7,690,631 | B2 | * | 4/2010 | Rathjen | 269/296 |
| 8,136,804 | B2 | * | 3/2012 | Leith | 269/37 |
| 2002/0135117 | A1 | * | 9/2002 | Weissenborn | 269/131 |
| 2010/0164158 | A1 | | 7/2010 | Weissenborn | |

* cited by examiner

*Primary Examiner* — Lee D Wilson
*Assistant Examiner* — Alvin Grant
(74) *Attorney, Agent, or Firm* — Richard C. Conover

(57) ABSTRACT

A ski tip hold down assembly for holding the tip end of the ski. The ski tip hold down assembly having a base attached to a work bench and an upright stand affixed to the base. The upright stand having a ski rest on a top surface thereof and a ski tip hold down bar secured to the upright stand in spaced apart relation to the ski rest defining an opening adapted to receive a ski tip, with the ski oriented in a base-up configuration, with the ski tip extending underneath the ski tip hold down bar. The apparatus further including a tail rest assembly having a base adapted to be used on the work bench in spaced apart relation to the ski tip hold down assembly and further including an upright stand affixed to the base with a ski rest provided on a top surface thereof.

4 Claims, 9 Drawing Sheets

APPARATUS FOR HOLDING A SKI OR SNOWBOARD DURING REPAIR AND MAINTENANCE

This application claims the benefit of provisional application Ser. No. 61/464,848 filed Mar. 10, 2011.

BACKGROUND OF INVENTION

The present invention relates to apparatus used to securely hold a ski or snowboard while working on the underside or base surface of the ski or snowboard. The apparatus also includes structure permitting the ski or snowboard to be placed in an edge-up orientation for ski edge maintenance procedures.

Ski holding systems for holding a ski so that repair or maintenance work can be done on the base of a ski or edges of a ski are known such as shown in U.S. Pat. No. 4,175,736 to Dietlein; U.S. Pat. No. 5,236,183 to Curtis and U.S. Pat. No. 6,663,099 to Weissenborn.

The apparatus according to the present invention is an improvement over the known ski holding systems, because this apparatus requires nothing more than placing the ski on the apparatus. No mechanical adjustments need to be made. The present invention is easy to use and can be used either to work on the base of the ski or the edges of the ski.

SUMMARY OF INVENTION

Apparatus for holding a ski on a work bench including a ski tip hold down assembly for holding the tip end of the ski. The ski tip hold down assembly having a base attached to a work bench and an upright stand affixed to the base. The upright stand having a ski rest on a top surface thereof and a ski tip hold down bar secured to the upright stand in spaced apart relation to the ski rest defining an opening adapted to receive a ski tip, with the ski oriented in a base-up configuration, with the ski tip extending underneath the ski tip hold down bar. The apparatus further including a tail rest assembly having a base adapted to be used on the work bench in spaced apart relation to the ski tip hold down assembly and further including an upright stand affixed to the base with a ski rest provided on a top surface thereof.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
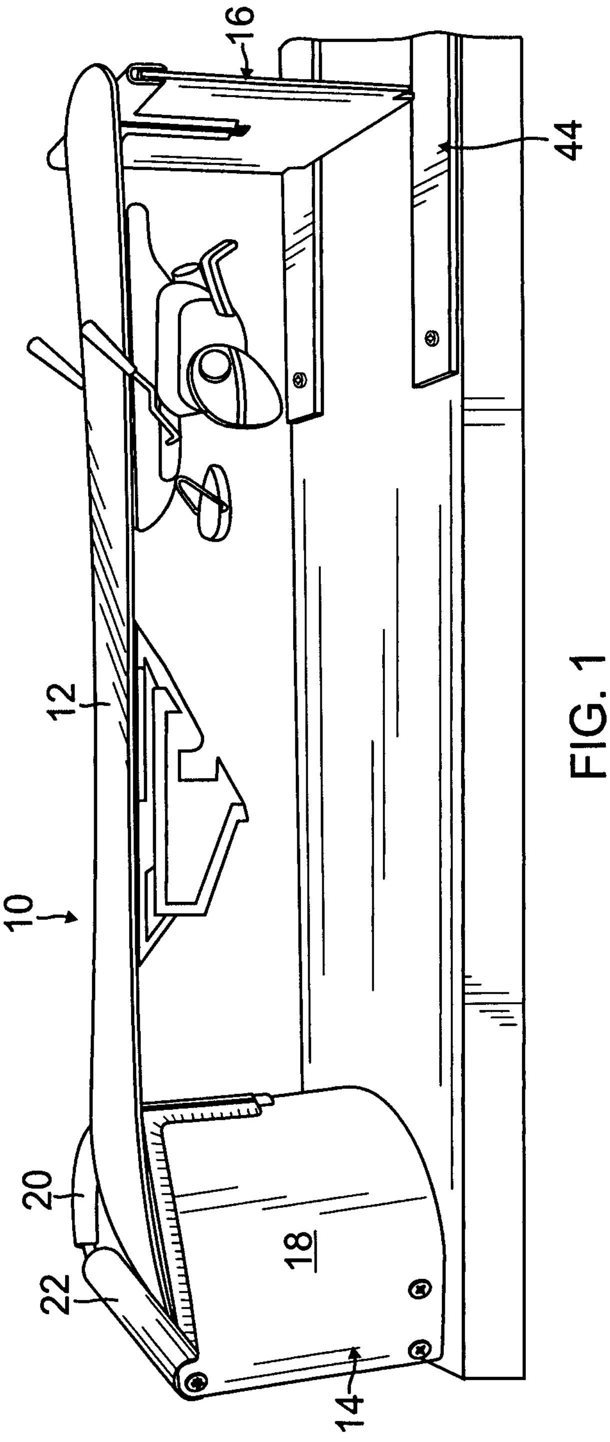
FIG. 1 is a perspective elevational view of apparatus according to the present invention holding a ski placed in a base-up orientation.

A ski holder apparatus 10 is shown in FIG. 1 for use with a ski 12 having a forward tip end and a tail end. Although the figures show an apparatus 10 holding a single ski, the apparatus 10, if enlarged from that as shown, could be used equally as well with a snowboard having a forward tip end and a tail end. The apparatus 10 includes a tip hold down assembly 14 and a tail rest assembly 16.

Figure 2:
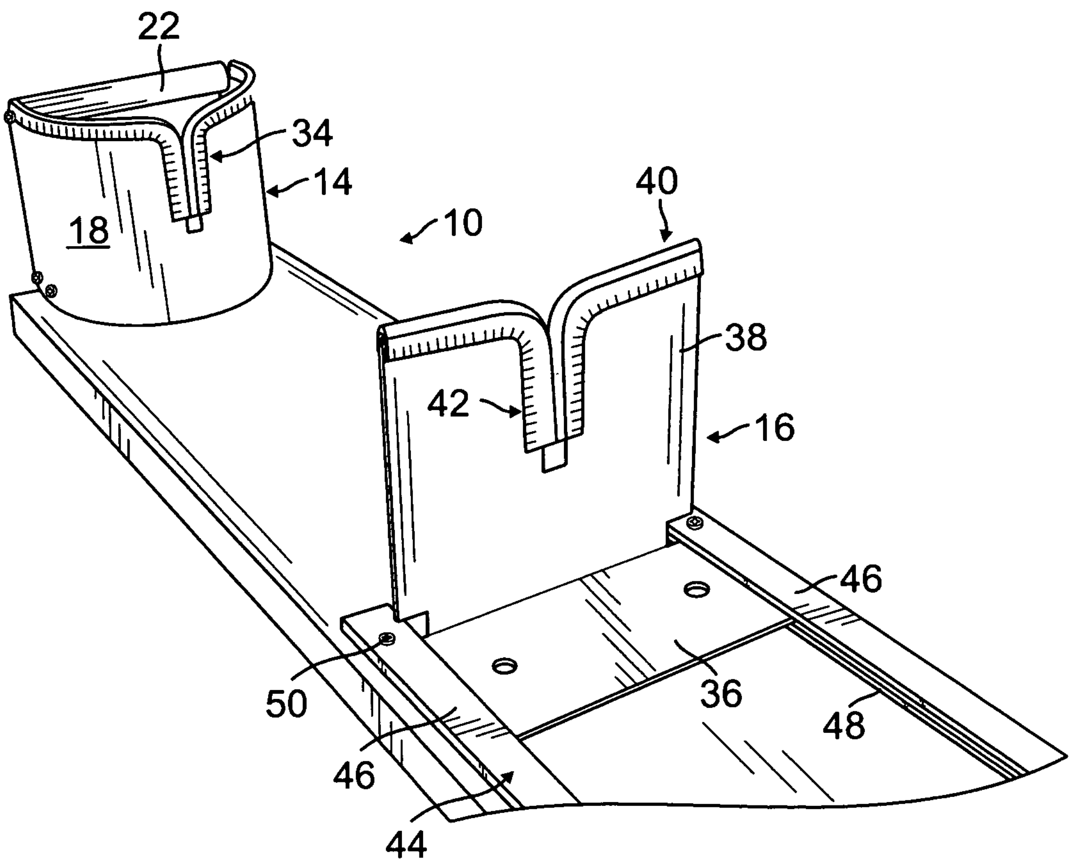
FIG. 2 is an end perspective view of the apparatus shown in FIG. 1.
Figure 3:
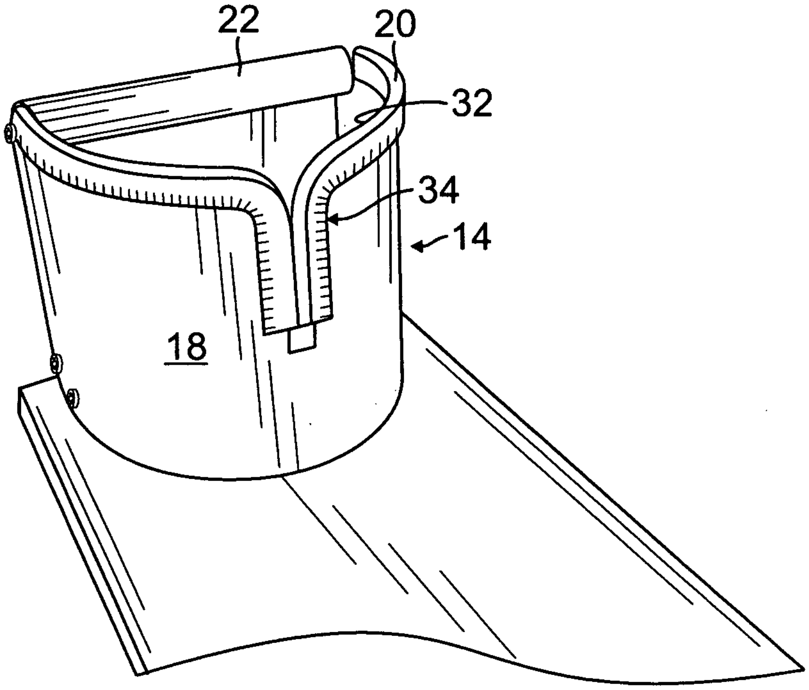
FIG. 3 is a perspective view of a ski tip hold down assembly used with the present invention.
Figure 4:
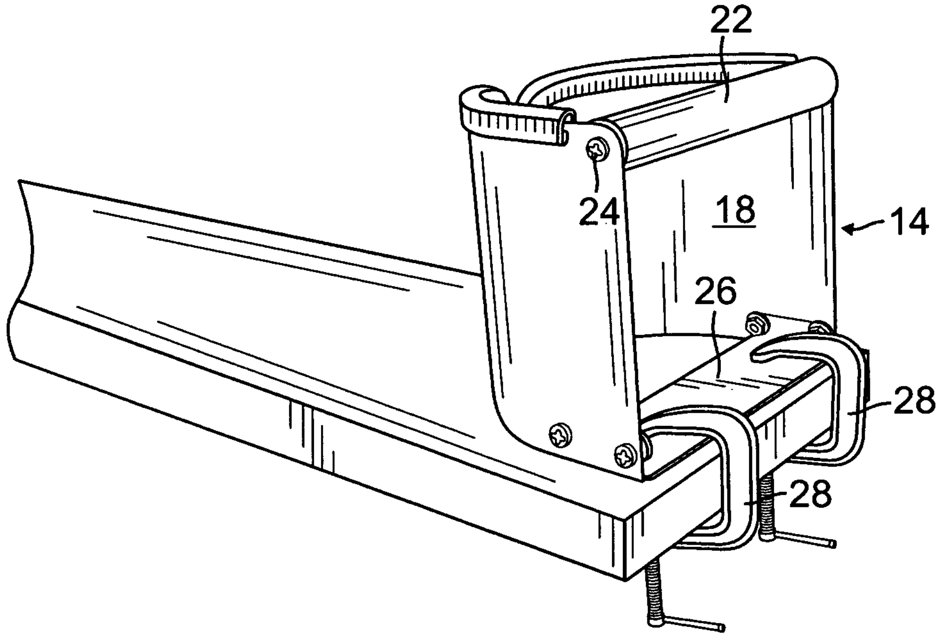
FIG. 4 is a perspective view of a ski tip hold down assembly shown in FIG. 3 showing “C” clamps for securing this assembly to a work bench.
Figure 5:
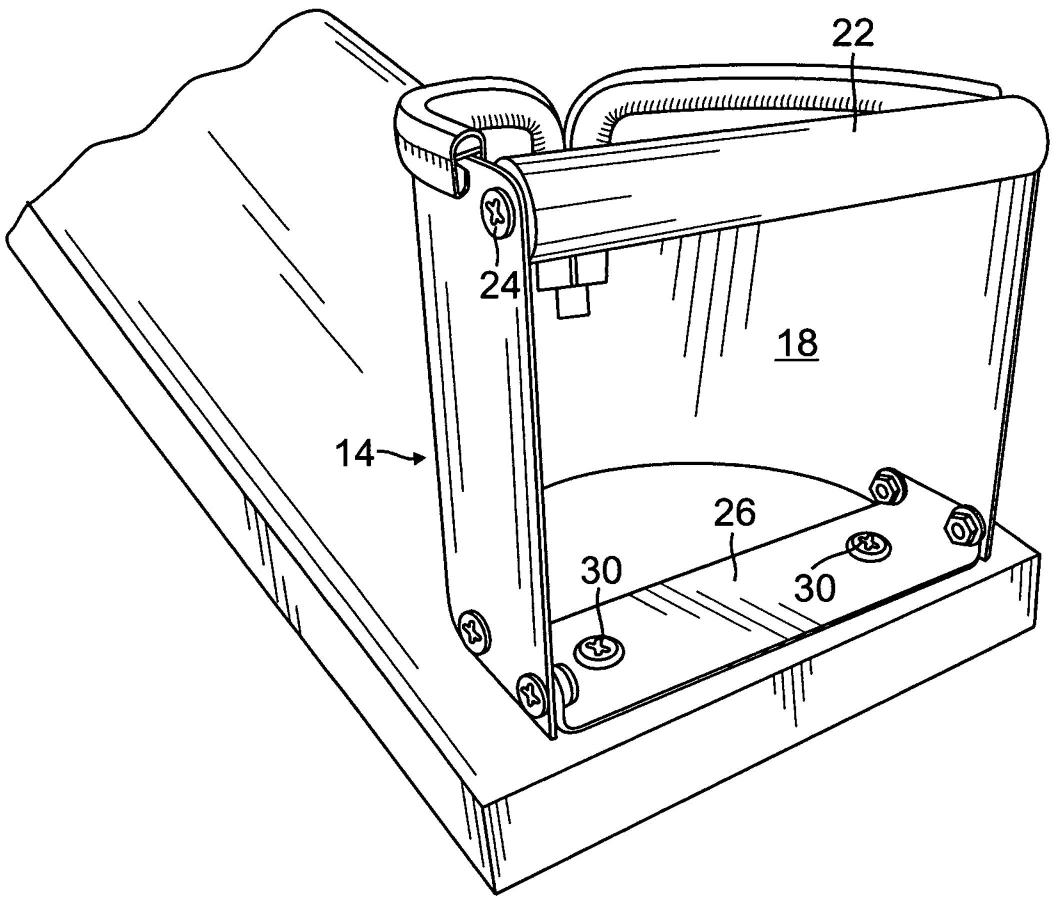
FIG. 5 is a perspective view of the ski tip hold down assembly shown in FIG. 4 showing screws for securing this assembly to a work bench.

The tip hold down assembly 14 is shown in FIGS. 2-5. The tip hold down assembly includes an upright ski hold down stand 18 which in a preferred embodiment includes a sheet of rigid material shaped in a semi-circular configuration. The top edge 20 of the upright ski hold down stand 18 functions as a ski rest for the tip end of the ski 12. A ski tip hold down bar 22 is joined to the upright ski hold down stand 18 and is mounted at the top edge 20 between the free ends thereof with bolts 24. A first base plate 26 is mounted to the bottom edge of the upright ski hold down stand 18 across the free ends of the upright ski hold down stand 18 as shown in FIGS. 4 and 5. The upright ski hold down stand 18 may be secured to a work bench with “C” clamps 28 clamping the first base plate 26 to the work bench as shown in FIG. 4. Also, the first base plate 26 could be secured to a work bench with screws 30 as shown in FIG. 5. Other means of attachment could be used equally as well.

As shown in FIG. 3, the ski tip hold down bar 22 and the top edge 20 of the upright ski hold down stand 18 define an opening 32 which is sized to receive the tip end of the ski 12 placed in a base-up orientation as shown in FIG. 1. The top edge 20 and bar 22 may be covered with rubber or plastic material to prevent scratching of the ski when the ski is being worked on Further, the upright ski hold down stand 18 is provided with a vertical slot 34 which is sized to receive a ski 12 placed in an edge-up orientation as shown in FIG. 6.

Figure 6:
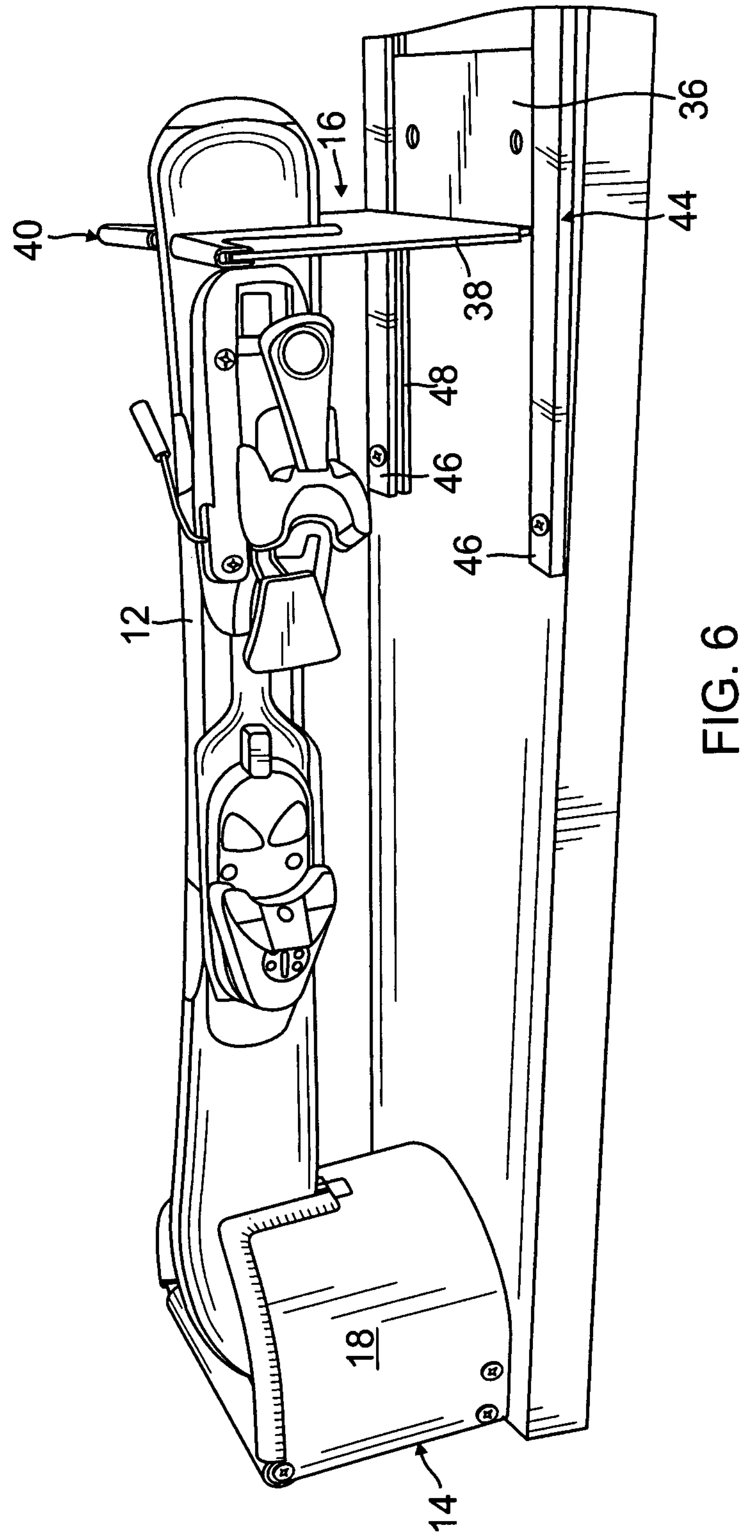
FIG. 6 is a perspective elevational view of the apparatus shown in FIG. 1 holding a ski placed in an edge-up orientation.

The tail rest assembly 16 is shown in FIGS. 1, 2, 6 and 7. The tail rest assembly 16 includes a second base plate 36 and an upright ski rest stand 38 secured to the second base plate 36. In a preferred embodiment, the upright ski rest stand 38 is constructed of a planer rigid material. The top edge 40 functions as a ski rest for supporting the tail end of the ski 12 when placed in a base-up orientation. The upright ski rest stand 38 is also provided with a slot 42 sized to receive a ski 12 in an edge-up orientation as shown in FIG. 6. The top edge 40 and slot 42 may be coated with rubber or plastic material to prevent scratching of the ski when the ski is being worked on.

Figure 7:
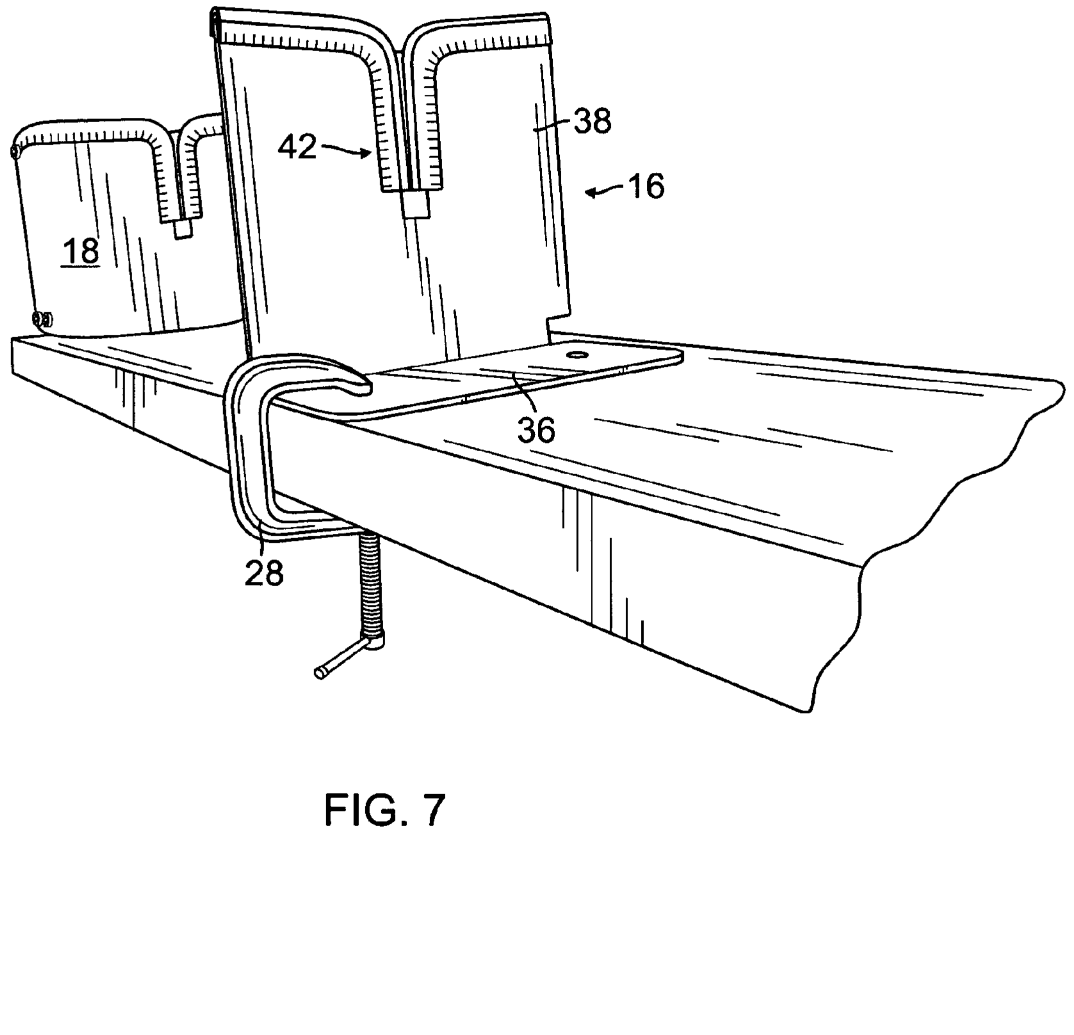
FIG. 7 is a perspective view of a ski tail rest assembly used with the present invention showing a “C” clamp for securing this assembly to a work bench.

The second base plate 36 of the tail rest assembly 16 may be secured to a work bench with a “C” clamp 28 as shown in FIG. 7. The second base plate 36 is also adapted to slidably ride in a track 44 as shown in FIG. 2. The track 44 includes a pair of rails 46 arranged in parallel relation with one another. The sides of the rails facing with one another each have a longitudinally running slot 48 sized to receive the lateral edges of the second base plate 36 as shown in FIG. 2. The rails in a preferred embodiment are attached to a work bench with screws 50 as shown in FIG. 2.

In using the ski holder apparatus 10 when working on the underside or base of the ski 12, the tail rest assembly 16 is slidably positioned on the work bench to accommodate the length of the ski to be worked on. The tail rest assembly 16 is then secured to the work bench with a "C" clamp, for example, as shown in FIG. 7 or if a track 44 is used the tail rest assembly 16 is moved in the track 44 to the desired position. The ski 16, in a base-up orientation, is then inserted into the opening 32 of the tip hold down assembly 14 and underneath the ski tip hold down bar 22 as shown in FIG. 1. When the tail end of the ski 16 is tipped downwardly to rest on the top edge 40 of the tail rest assembly 16, the tip end of the ski is leveraged upwardly against the ski tip hold down bar 22 thereby securely holding the ski in a workable position. Although not necessary, a clamping means may be used to hold down the tail end of the ski 12 on the top edge 40 of the tail rest assembly 16.

When this invention is to be used for working on the edges of ski 12, the ski 12 is inserted in the slot 34 of the tip hold down assembly 14 and the slot 42 of the tail rest assembly 16 as shown in FIG. 6.

Figure 8:
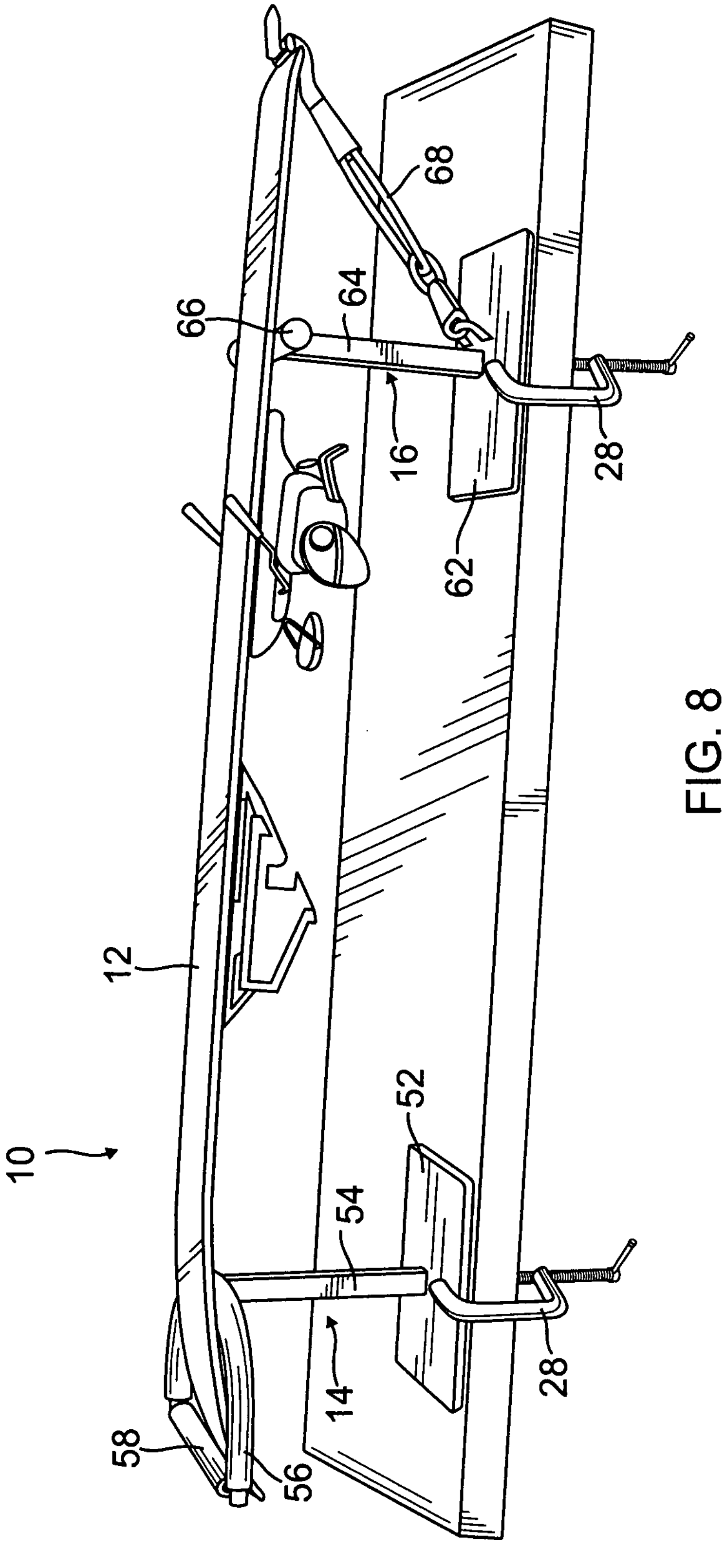
FIG. 8 is a perspective elevational view of apparatus according to a second embodiment of the present invention.
Figure 9:
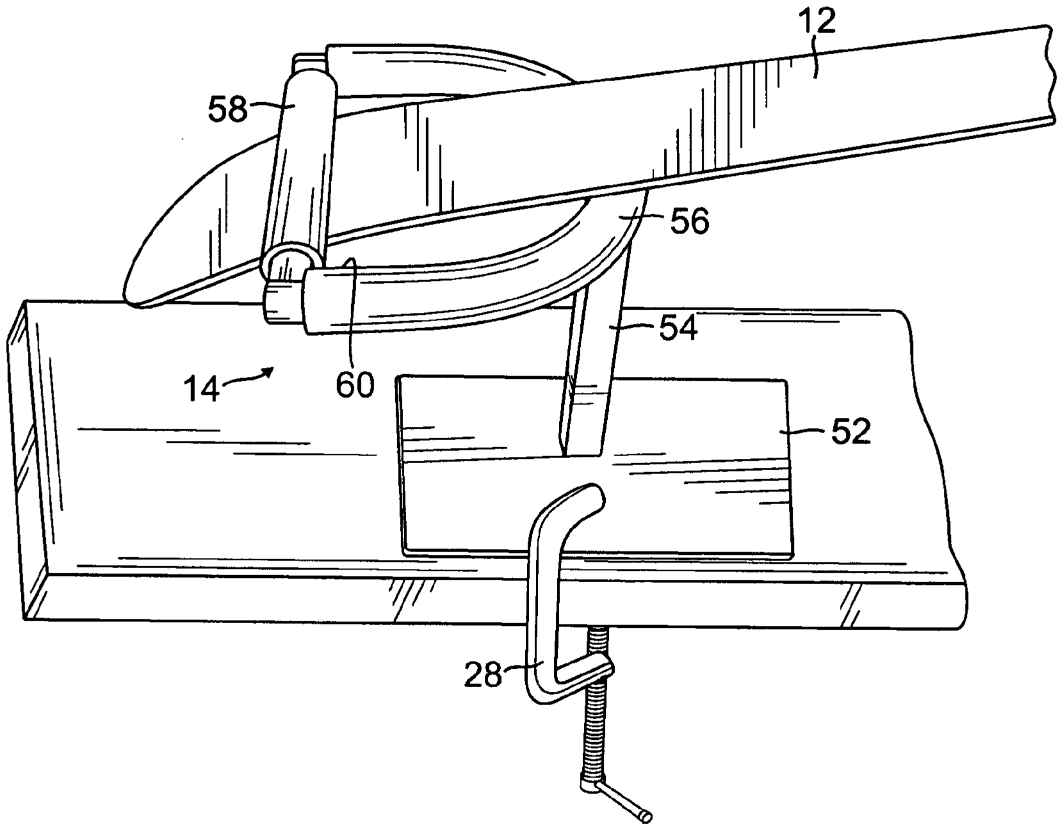
FIG. 9 is a perspective view of a ski tip hold down assembly used with the second embodiment of the present invention.

A second embodiment of a ski holder apparatus 10 is shown in FIG. 8. This embodiment includes a tip hold down assembly 14 and a tail rest assembly 16 for holding the ski 12. The tip hold down assembly 14 includes a third base plate 52 which may be secured to a work bench with a "C" clamp 28. An upright stand 54 has one end secured to the third base plate 52 as by welding. The stand 54 is also secured at a distal end to a midpoint of the curved portion of a "U" shaped bar 56 which is oriented in a horizontal plane. A ski tip hold down bar 58 joins the free ends of the "U" shaped bar 56 defining an opening 60 as shown in FIG. 9 sized to receive the tip end of the ski 12 placed in a base-up orientation as shown in FIG. 9. The "U" shaped bar 56 and ski tip hold down bar 58 may be coated with rubber or plastic material to prevent scratching of the ski when the ski is being worked on.

Figure 10:
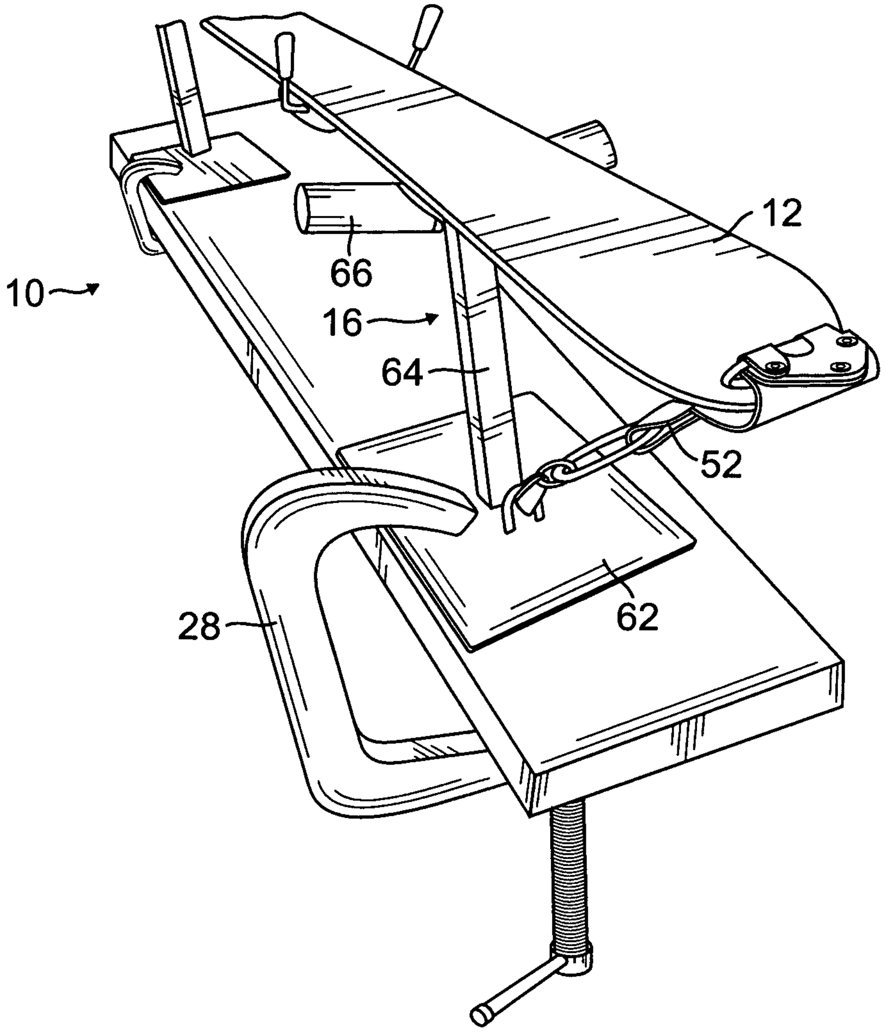
FIG. 10 is a perspective view of a ski tail rest assembly used with the second embodiment of the present invention.

The tail rest assembly 16 is shown in FIGS. 8 and 10, The tail rest assembly 16 includes a fourth base plate 62 which may be clamped to a work bench with a "C" clamp 28 or the fourth base plate 62 has lateral edges for slidable engagement with the track 44 as shown in FIGS. 1 and 6. The tail rest assembly 16 further includes an upright post 64 secured to the fourth base plate 62 as shown in Fig, 10. At the upper free end of the post 64 a bent ski rest bar 66 is secured to the post 64 as by welding. The ski rest 66 may be coated with rubber or plastic material to prevent scratching of the ski when working on the ski.

In operation, the ski holder apparatus 10 according to the second embodiment is used similar to the ski holder apparatus 10 according to the first embodiment. The tip of the ski 12, placed in a base-up orientation, is inserted through the opening 60 so that the tip of the ski rides underneath the ski tip hold down bar 58. The tail rest assembly 16 is adjusted in position on the work bench to accommodate the length of the ski 12 to be worked on. The tail end of the ski 12 is then tipped downwardly so that the tail end of the ski 12 rests on the ski rest 66. The tipping of the ski downwardly after the tip of the ski has been inserted underneath the ski tip hold down bar 58 securely holds the ski in place because of the leverage force acting on the tip of the ski 12 underneath the ski tip hold down bar 58. Although not necessary, a device can be used for positively holding the tail end of the ski 12 down on the ski rest 66. One example of such a device is shown in FIG. 8 where an elastic cord 68 connected to the base plate 52 is clipped to the tail end of the ski 12. Other devices could be used equally as well.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. A ski/snowboard hold down tool for use with a ski/snowboard having a tip end and a tail end comprising:
- a ski tip hold down assembly comprising:
  - a first base plate adapted to be secured to the work bench;
  - an upright ski hold down stand affixed to the first base plate;
  - the upright ski hold down stand having a ski rest on a top surface thereof adapted to support a ski in a base-up orientation; and
  - a ski tip hold down bar secured to the upright ski hold down stand in spaced apart relation to the ski rest defining an opening between the ski rest and the ski tip hold down bar;
  - the opening adapted to receive the tip end of a ski in a base-up orientation with the ski tip extending underneath the ski tip hold down bar; and
- a ski tail rest assembly comprising:
  - a second base plate adapted to be used on the work bench in spaced apart relation to the ski tip hold down assembly; and
  - an upright ski rest stand affixed to the second base plate;
  - the upright ski rest stand having a ski rest on a top surface thereof adapted to support a ski in a base-up orientation.

2. The apparatus according to claim 1 wherein the second base plate of the ski tail rest assembly is slidably mounted in a track adapted to adjust the spaced-apart distance between the ski tip hold down assembly and the ski tail rest assembly.

3. The apparatus according to claim 1 wherein the upright ski hold down stand of the ski tip hold down assembly and the upright ski rest stand of the ski tail rest assembly are each provided with a vertical slot adapted to receive a ski in an edge-up orientation.

4. The apparatus according to claim 1 wherein a resilient means is provided for holding down the tail end of the ski on the ski rest of the ski tail rest assembly.

* * * * *